United States Patent
Okada et al.

(10) Patent No.: US 7,154,919 B2
(45) Date of Patent: Dec. 26, 2006

(54) OPTICAL FIBER LASER AND LASER LIGHT EMITTING METHOD

(75) Inventors: Yasuyuki Okada, Sakura (JP); Takeshi Segi, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 248 days.

(21) Appl. No.: 10/857,480

(22) Filed: Jun. 1, 2004

(65) Prior Publication Data
US 2004/0240488 A1 Dec. 2, 2004

(30) Foreign Application Priority Data

| Jun. 2, 2003 | (JP) | P2003-156988 |
| Jun. 10, 2003 | (JP) | P2003-165075 |
| Nov. 12, 2003 | (JP) | P2003-382617 |

(51) Int. Cl.
*H01S 3/30* (2006.01)

(52) U.S. Cl. ............................. 372/6; 372/70
(58) Field of Classification Search .............. 372/6, 372/70
See application file for complete search history.

(56) References Cited

U.S. PATENT DOCUMENTS

| 5,067,134 A | * | 11/1991 | Oomen ....................... 372/6 |
| 5,084,880 A | | 1/1992 | Esterowitz et al. |
| 5,200,966 A | * | 4/1993 | Esterowitz et al. ............ 372/71 |
| 5,226,049 A | * | 7/1993 | Grubb ......................... 372/6 |
| 5,659,558 A | * | 8/1997 | Tohmon et al. .............. 372/5 |
| 6,278,719 B1 | * | 8/2001 | Ohishi et al. ................. 372/6 |
| 6,510,276 B1 | * | 1/2003 | Jain et al. .................... 385/142 |

FOREIGN PATENT DOCUMENTS

EP 1039593 A2 9/2000

OTHER PUBLICATIONS

Dickinson, B.C. et al.: "Investigation of a 791-nm pulsed-pumped 2.7-μm Er-doped ZBLAN fibre laser"; Optics Communication Elsevier Netherlands, vol. 191, No. 3-6, May 8, 2001, pp. 315-321.
Sandrock, T. et al.: "Laser emission of erbium-doped fluoride bulk glasses in the spectral range from 2.7 to 2.8 μm"; Optics Letters Opt. Soc. America, USA, vol. 24, No. 6, Mar. 15, 1999, pp. 382-384.
Pollnau, M.: "The Route Toward a Diode-Pumped 1-W Erbium 3-μm Fiber Laser"; IEEE Journal of Quantum Electronics, IEEE Inc. New York, US, vol. 33, No. 11, Nov. 1, 1997, pp. 1982-1990.
Ziolek, C. et al.: "High-repetition-rate 2.70 and 2.79 μm ErCr:YSGG lasers"; Technical Digest, Summaries of Papers Presented at the Conference on Lasers and Electro-Optics, Conference Edition, 1998 Technical Digest Series, vol. 6, Opt. Soc. America Washington, DC, USA, 1998, pp. 298-299.

(Continued)

*Primary Examiner*—Armando Rodriguez
*Assistant Examiner*—Delma R. Flores Ruiz
(74) *Attorney, Agent, or Firm*—Sughrue Mion, PLLC

(57) ABSTRACT

An optical fiber laser includes a resonator comprising an erbium-doped glass fiber serving as a gain medium and a pumping light source that launches pumping light into the erbium-doped glass fiber. The pumping light source emits pumping light of a wavelength of 980 nm or longer, and the optical fiber laser emits laser light in a wavelength band of 2.8 μm (2.7 μm to 3.0 μm).

11 Claims, 6 Drawing Sheets

OTHER PUBLICATIONS

M. Pollnau et al., "Cross Sections of Excited-State Absorption at 800nm in Erbium-Doped ZBLAN Fiber", Applied Physics B, Springer-Verlag, 1998, vol. 67, pp. 23-28.

Richard Quimby, "Proceedings of the Meeting: Fiber Laser Sources and Amplifiers" The International Society for Optical Engineering, 1991, vol. 1581, pp. 72-79.

* cited by examiner

OPTICAL FIBER LASER AND LASER LIGHT EMITTING METHOD

BACKGROUND OF THE INVENTION

1. Field of the Invention

The present invention relates to an optical fiber laser incorporating an erbium doped fiber as a gain medium. In particular, it relates to an optical laser that emits laser light in the wavelength band of 2.8 μm (2.7 μm to 3.0 μm) and to a method of emitting the laser light.

This application claims priority on Japanese Patent Application No. 2003-156988 filed on Jun. 2, 2003, Japanese Patent Application No. 2003-165075 filed on Jun. 10, 2003 and Japanese Patent Application No. 2003-382617 filed on Nov. 12, 2003, of which are incorporated herein.

2. Description of the Related Art

Lasers operating in the wavelength range of 2.8 μm to 2.9 μm, which is the water absorption band, are used in the medical field and the like. As such a laser operating in the wavelength range of 2.8 μm to 2.9 μm, there has been proposed an optical fiber laser incorporating an erbium doped fiber (also referred to as EDF, hereinafter) as a gain medium (for example, see Applied Physics B by M. Pollnau et al., 1998, Vol. 67, pp. 23–28). In general, the optical fiber emits laser light in the wavelength band of 2.8 μm (2.7 μm to 3.0 μm) using pumping light in a wavelength of shorter than 980 nm.

In order to increase the power of the laser light of the optical fiber laser described above, the EDF serving as the gain medium must be longer. However, the longer EDF leads to a longer resonator (or a longer resonator length), resulting in a reduced peak power of the laser light and a larger temporal half-width of the laser light.

Thus, there is a need to enhance the emission efficiency of laser light to achieve a high laser power with a relatively short resonator length.

FIG. 7 is an energy level diagram for erbium ions of an erbium doped fiber.

When pumping light in a wavelength band of 980 nm is launched into the EDF, ions in the ground state ($^4I_{15/2}$) are excited to the upper level ($^4I_{11/2}$) due to ground state absorption (also referred to as GSA, hereinafter). Then, when the ions decay to the lower level ($^4I_{13/2}$) from the upper level ($^4I_{11/2}$), the laser light in a wavelength band of 2.8 μm (2.7 μm to 3.0 μm) is emitted.

If excited state absorption (also referred to as ESA, hereinafter) occurs in the upper level ($^4I_{11/2}$), the ions are excited to a still higher energy level ($^4F_{7/2}$), and the emission efficiency of the laser light in a wavelength band of 2.8 μm (2.7 μm to 3.0 μm) is reduced.

Recently, there has been a report on absorption spectra of GSA and ESA in a wavelength band of 980 nm for the EDF (for example, see the "Proceedings of the Meeting: Fiber laser sources and amplifiers" by Richard Quimby, The International Society for Optical Engineering, 1991, vol. 1581, pp. 72–79).

If the ESA is reduced, a higher emission efficiency can be achieved, and the laser power of the optical fiber can be raised without elongation of the optical fiber. However, research concerning the excitation condition has been insufficient, and the optimum wavelength of the pumping light has not been found yet.

FIG. 8 is a graph showing a relationship between the peak wavelength of laser light emitted from a conventional optical fiber laser and the power of the pumping light.

The conventional optical fiber laser uses one pumping light in the wavelength of shorter than 980 nm. As can be seen from the drawing, as the power of the pumping light increases, the peak wavelength of the emitted laser light is shifted toward longer wavelengths. Thus, the conventional optical fiber laser has a problem that the peak wavelength of the laser light varies with the power of the pumping light when adjusting the power of the pumping light to achieve a desired value of the laser light power. For example, in the case in which the optical fiber laser is used for medical purposes, if the peak wavelength of the laser light varies, there arises a problem of a reduced capability of cutting or ablating of living tissues.

The mechanism of how this problem occurs will be described below.

In general, each energy level at the time of laser emission is often represented as one line as shown in FIG. 9. However, actually, each level splits into several sub-levels at narrow intervals as shown in FIG. 10. These sub-levels are referred to as Stark levels. The wavelength of the emitted laser light (emitted light wavelength) depends on the Stark levels between which the ion transition causing the light emission occurs.

If the intensity (power) of the pumping light is increased, ions at the ground state level ($^4I_{15/2}$) shown in FIG. 9 are excited. Therefore the number of ions occupying the upper level of erbium ($^4I_{11/2}$) and the lower level of erbium ($^4I_{13/2}$) increase.

Since lower Stark levels are occupied by ions earlier than higher ones in each energy level, the lower Stark levels in the lower level ($^4I_{13/2}$) are also occupied by ions earlier than the higher ones.

As the intensity (power) of the pumping light increases, the lower Stark levels of the lower level ($^4I_{13/2}$) are occupied by ions and become incapable of contributing to light emission, and thus, the higher Stark levels, which are occupied by fewer ions, participate in light emission. As a result, the interval between the lower level ($^4I_{13/2}$) and the upper level ($^4I_{11/2}$) is reduced, and thus, the wavelength of the laser light (emitted light wavelength) is disadvantageously shifted toward longer wavelengths.

SUMMARY OF THE INVENTION

The present invention was made in view of the circumstances described above.

A first object of the present invention is to provide an optical fiber laser that has a high light emission efficiency and can achieve a high laser power.

A second object of the present invention is to provide an optical fiber laser that can stably emit laser light of a constant wavelength, preventing the peak wavelength of the emitted laser light from being shifted even if the intensity (power) of the pumping light varies.

An optical fiber laser according to the first aspect of the present invention includes: a resonator comprising an erbium doped glass fiber serving as a gain medium; and a pumping light source that launches pumping light into the erbium-doped glass fiber, in which the pumping light source emits pumping light of a wavelength of 980 nm or longer, and the optical fiber laser emits laser light in a wavelength band of 2.8 μm (2.7 μm to 3.0 μm).

According to this aspect of the present invention, since the wavelength of the pumping light is 980 nm or longer, the laser light in the wavelength band of 2.8 μm (2.7 μm to 3.0 μm) of a high power can be emitted with a high efficiency.

The wavelength of the pumping light may be between 985 nm and 1000 nm. In this case, the laser light of a high power can be emitted with a high efficiency compared with the case in which conventional pumping light of a wavelength of shorter than 980 nm is used.

An optical fiber laser according to the second aspect of the present invention includes: a resonator comprising an erbium doped glass fiber serving as a gain medium; and a plurality of pumping light sources that launch pumping light into the erbium-doped glass fiber, in which the plurality of pumping light sources include a first pumping light source that emits first pumping light that causes ground state absorption and a second pumping light source that emits second pumping light that causes excited state absorption from a $^4I_{13/2}$ level.

According to this aspect of the present invention, even if the intensity (power) of the pumping light varies, the laser light of a constant wavelength can be stably emitted with a high efficiency while preventing the peak wavelength of the laser light from being shifted toward longer wavelengths.

The optical fiber laser may emit laser light in a wavelength band of 2.8 μm (2.7 μm to 3.0 μm) due to transition of erbium ions from a $^4I_{11/2}$ level down to the $^4I_{13/2}$ level.

The second pumping light may not cause excited state absorption from the $^4I_{11/2}$ level.

The wavelength of the first pumping light may be between 960 nm and 1020 nm. In this case, the laser light in a wavelength range of 2.8 μm to 2.9 μm of a high power can be emitted with a high efficiency.

The wavelength of the second pumping light may be between 780 nm and 792 nm. In this case, it is possible to cause ESA by the erbium ions at the lower level ($^4I_{13/2}$) without causing ESA by the erbium ions at the upper level $^4I_{11/2}$). Thus, the laser light of a constant wavelength can be emitted further stably while preventing the peak wavelength thereof from being shifted toward longer wavelengths.

A laser light emitting method according to the first aspect of the present invention is a method for emitting laser light in a wavelength band of 2.8 μm (2.7 μm to 3.0 μm) by launching pumping light into a resonator comprising an erbium doped glass fiber serving as a gain medium, in which the pumping light is light of a wavelength of 980 nm or longer.

According to this aspect of the present invention, the laser light in the wavelength band of 2.8 μm (2.7 μm to 3.0 μm) of a high power can be emitted with a high efficiency.

The wavelength of the pumping light may be between 985 nm and 1000 nm. In this case, the laser light of a high power can be emitted with a high efficiency compared with the case where conventional pumping light of a wavelength of shorter than 980 nm is used.

A laser light emitting method according to the second aspect of the present invention is a method for emitting laser light by launching a plurality of rays of pumping light into a resonator comprising an erbium-doped glass fiber serving as a gain medium, in which, as the plurality of rays of pumping light, first pumping light that causes ground state absorption and second pumping light that causes excited state absorption from a $^4I_{13/2}$ level are concurrently used.

According to this aspect of the present invention, even if the intensity (power) of the pumping light varies, the laser light of a constant wavelength can be stably emitted with a high efficiency while preventing the peak wavelength of the laser light from being shifted toward longer wavelengths.

Laser light in a wavelength band of 2.8 μm (2.7 μm to 3.0 μm) may be emitted by the pumping light causing transition of erbium ions from a $^4I_{11/2}$ level down to the $^4I_{13/2}$ level.

As the pumping light, first pumping light may be in a wavelength range of 960 nm to 1020 nm and second pumping light may be in a wavelength range of 780 nm to 792 nm, and the first pumping light and the second pumping light may be concurrently used. In this case, the laser light of a constant wavelength between 2.8 μm and 2.9 μm of a high power can be emitted stably with a high efficiency.

A laser light emitting method according to the third aspect of the present invention is a method for emitting laser light by launching a first pumping light having a first wavelength into a resonator having an erbium-doped glass fiber serving as a gain medium, exciting erbium ions of the erbium-doped glass fiber from a ground state to a first energy level, and launching a second pumping light having a second wavelength into the resonator, exciting erbium ions from a second energy level to a third energy level, in which the second energy level is between the ground state and the first energy level, and the third energy level is higher than the first energy level, and emitting laser light from the resonator resulting from excited erbium ions decaying from the first energy level to the second energy level, in which the launching of the second pumping light having the second wavelength does not excite erbium ions from the first energy level to a higher energy level.

The launching of the first pumping light, the launching of the second pumping light, and the emitting of the laser light may be concurrent.

The first wavelength and the second wavelength may be different.

DETAILED DESCRIPTION OF THE PREFERRED EMBODIMENTS

In the following, preferred embodiments of the present invention will be described with reference to the drawings. The present invention should not be limited to the embodiments described below, and components in the embodiments may be appropriately combined with each other.

Figure 1:
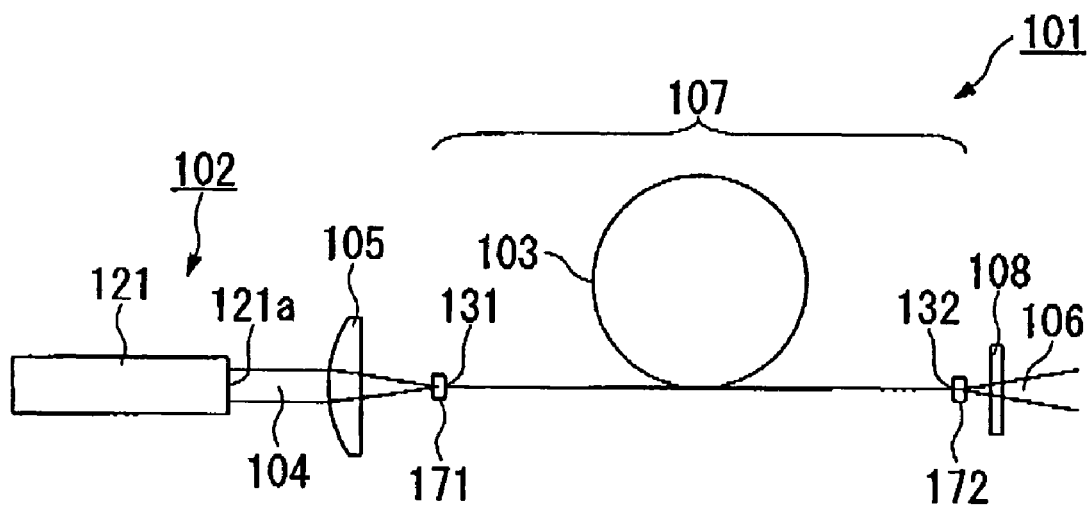
FIG. 1 is a schematic diagram showing an optical fiber laser of an embodiment according to an aspect of the present invention.

FIG. 1 is a schematic view of an exemplary optical fiber laser according to an aspect of the present invention.

An optical fiber laser 101 includes a pumping light source 102 and an erbium-doped fiber (also referred to as EDF, hereinafter) 103 serving as a gain medium.

The pumping light source 102 may be any one which can emit pumping light 104 of a wavelength of 980 nm or longer. For example, it may be a semiconductor laser or titanium-sapphire laser capable of emitting the pumping light 104 of a wavelength of 980 nm or longer or a laser module provided with such a laser. As an example, FIG. 1 shows the pumping light source 102 comprising a semiconductor laser module 121. Opposed to a laser emission port 121a of the semiconductor laser module 121, a condenser lens 105 is provided. The condenser lens 105 serves to condense the pumping light 104 emitted from the semiconductor laser module 121 and to couple the pumping light 104 to an entrance end face 131 of the EDF 103 with a rear mirror 171, described below, vapor-deposited thereon.

The EDF 103 may be any one which is made of a glass material, such as fluoride glass or silica glass, doped with erbium (Er), and can serve as a gain medium. The composition of constituent elements of the EDF 103 is adjusted so that laser light 106 in the wavelength band of 2.8 μm (2.7 μm to 3.0 μm) can be emitted.

For example, the EDF 103 may be a double cladded fiber comprising a core made of a fluoride glass doped with erbium and having a diameter of 10 μm, a first cladding surrounding the core and having a rectangular cross section measuring 100 μm by 200 μm, and a second cladding surrounding the first cladding. The present invention is not limited thereto, and the diameter of the core, and the shape and size of the claddings can be arbitrarily determined.

Here, the "double cladded fiber" refers to an optical fiber having two layers of cladding around a core. In such a double cladded fiber, pumping light launched into the fiber propagates in the first cladding around the core, and laser light produced in the core propagates in the core.

The EDF 103 has one end face (also referred to as an entrance end face) 131 opposed to the condenser lens 105.

On the entrance end face 131 of the EDF 103, the rear mirror 171 is deposited. On the other end face (also referred to as an exit end face) 132, an output coupler 172 is provided.

The rear mirror 171 may be a dielectric multilayer film filter comprising several to several hundred thin films of materials different in refractive index, such as $SiO_2$ or $Ta_2O_5$, having a thicknesses of several tens to several hundred nanometers. The rear mirror 171 is formed on the entrance end face 131 of the EDF 103 by vapor deposition of the dielectric multilayer film or the like. The rear mirror 171 allows the pumping light 104 to pass therethrough and reflects the laser light produced in the EDF 103.

The output coupler 172 may be one using Fresnel reflection at the exit end face 132 as an output coupler or having a dielectric multilayer film (multilayer film mirror), for example. The output coupler 172 is formed on the exit end face 132 of the EDF 103 by vapor deposition of the dielectric multilayer film. The output coupler 172 reflects some of the laser light 106 emitted from the EDF 103 and allows the remainder of the laser light 106 to pass therethrough.

On the side of the exit end face 132 of the EDF 103, a long-wavelength pass filter 108 is provided. The long-wavelength pass filter 108 may be one comprising layers of a plurality of oxides of different refractive index. The long-wavelength pass filter 108 is provided in the propagation path of the laser light 106 emitted from the output coupler 172. The long-wavelength pass filter 108 allows only part of the laser light 106 emitted from the output coupler 172, which has a wavelength of 2.56 μm or longer, to pass therethrough to be output.

In the optical fiber laser 101, the rear mirror 171 and the output coupler 172 serve as reflecting mirrors. In addition, since the rear mirror 171 and the output coupler 172 are opposed to each other with the EDF 103 interposed therebetween, the EDF 103, the rear mirror 171 and the output coupler 172 cooperatively function as a resonator 107.

In the optical fiber laser 101, the pumping light source 102 emits the pumping light 104 of a wavelength of 980 nm or longer. The pumping light 104 is condensed by the condenser lens 105 and coupled to the entrance end face 131 of the EDF 103 with the rear mirror 171 vapor-deposited thereon. Then, the EDF 103 is excited by the incident pumping light 104 and emits the laser light 106 in the wavelength band of 2.8 μm (2.7 μm to 3.0 μm) from the exit end face 132.

In the optical fiber laser 101, the laser light 106 in the wavelength band of 2.8 μm (2.7 μm to 3.0 μm) is emitted from the EDF 103 by varying the wavelength of the pumping light 104 in the range of 966 nm to 1011 nm. The result of measurement of the power of the laser light 106 will be described below.

Figure 2:
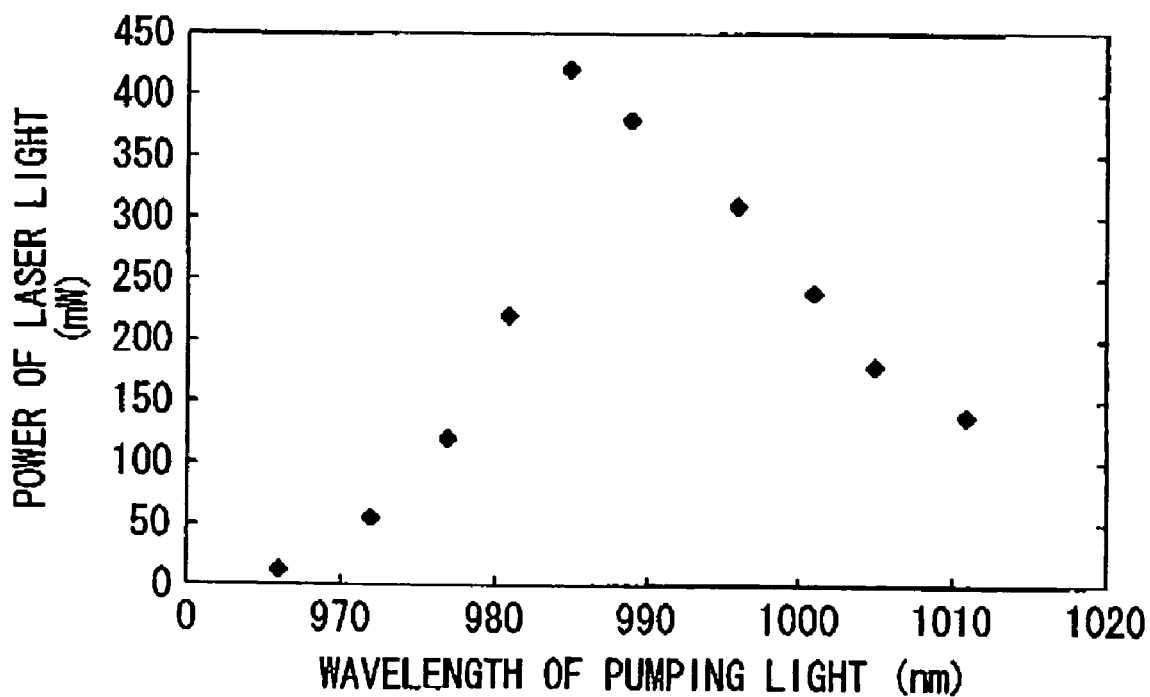
FIG. 2 is a graph showing a relationship between the power of laser light in the wavelength band of 2.8 μm (2.7 μm to 3.0 μm) emitted from an exemplary optical fiber laser based on FIG. 1 and the wavelength of the pumping light.

FIG. 2 shows a relationship between the power of the laser light 106 in the wavelength band of 2.8 μm (2.7 μm to 3.0 μm) emitted from the EDF 103 and the wavelength of the pumping light 104.

As the EDF 103, a single mode fiber having a double cladded structure and made of Zr—Ba—La—Al—Na fluoride (that is a fluoride glass, also referred to as ZBLAN) doped with erbium is used. The core diameter of the EDF 103 is 10 μm, and the first cladding has a rectangular cross section measuring 100 μm by 200 μm. In addition, the power of the pumping light 104 incident on the EDF 103 is constant; specifically, 2 W.

When the wavelength of the pumping light 104 is between 965 nm and 985 nm, the longer the wavelength of the pumping light 104, the higher the power of the produced laser light 106. The power of the laser light 106 reaches a maximum when the pumping light 104 has a wavelength of 985 nm.

As can be seen from the drawing, when the wavelength of the pumping light 104 is between 985 nm and 1000 nm, the power of the laser light 106 is equal to or higher than 240 mW, and the laser light 106 produced has higher intensities than the laser light caused by the pumping light 104 of a wavelength of 980 nm.

The optical fiber laser according to this aspect of the present invention can emit the laser light 106 in the wavelength band of 2.8 μm (2.7 μm to 3.0 μm) with a high emission efficiency if the wavelength of the pumping light 104 is set at 980 nm or longer. The wavelength of the pumping light 104 preferably falls within the range of 985 nm to 1000 nm, and, in that case, the laser light 106 can be produced which has a higher emission efficiency and higher power than those of the laser light produced using conventional pumping light of a wavelength of shorter than 980 nm.

In addition, the EDF 103 made of a fluoride glass substantially does not absorb light in the wavelength band of 2.8 μm (2.7 μm to 3.0 μm). Thus, the propagation loss of the laser light 106 in the wavelength band of 2.8 μm (2.7 μm to 3.0 μm) can be low. Therefore, the laser light 106 in the wavelength band of 2.8 μm (2.7 μm to 3.0 μm) of a much higher power can be emitted with a much higher efficiency.

In the case in which the EDF 103 has a double cladded structure, the first cladding, which allows the pumping light 104 pass therethrough, serves as an excitation region. Thus, a wide area of the entrance end face 131 of the EDF 103 including the first cladding can be irradiated with the pumping light 104, and a semiconductor laser of a high power can be used as the pumping light source 102, for example. Thus, the laser light 106 in the wavelength band of 2.8 μm (2.7 μm to 3.0 μm) of a high power can be emitted relatively easily.

Here, the technical scope of the present invention is not limited to the embodiment described above, and many alterations are possible without departing from the spirit of the present invention.

For example, the pumping light source 102 may be provided with a lead fiber at the light emission port, the lead fiber being for the pumping light to exit and connected to the EDF 103 by butt joining.

The core radius, reeve index distribution, erbium density distribution and the like of the EDF 103 are not particularly limited. For example, the EDF 103 may be a multimode fiber or one having a first cladding which is a square or circle in cross section.

In addition, a Q switch or the like may be provided on the side of the entrance end face 131 or exit end face 132 of the EDF 103 to enable pulse oscillation of the laser light 106.

Figure 3:
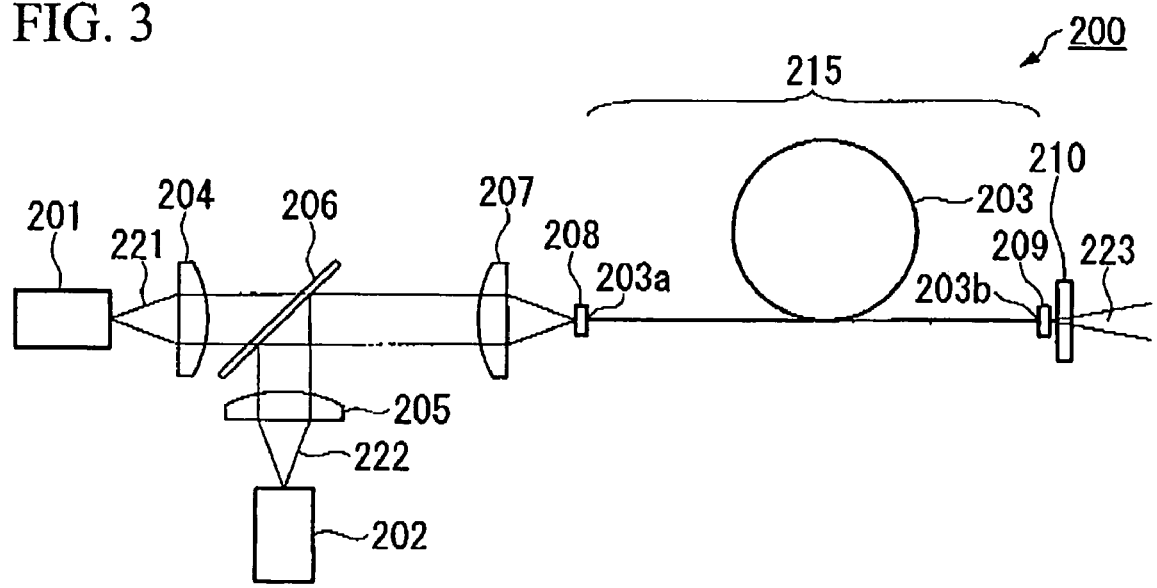
FIG. 3 is a schematic diagram showing an optical fiber laser of an embodiment according to another aspect of the present invention.

FIG. 3 is a schematic diagram showing an exemplary optical fiber laser according to another aspect of the present invention.

In general, an optical fiber laser 200 includes a first pumping light source 201, a second pumping light source 202, an erbium-doped glass fiber (also referred to as an EDF, hereinafter) 203 serving as a gain medium, collimator lenses 204 and 205, a multilayer film filter 206, a condenser lens 207, a rear mirror 208, an output coupler 209, and a long-wavelength pass filter 210.

The first pumping light source 201 may be any one which can emit light (first pumping light 221) in a wavelength band which allows occurrence of ground state absorption in the EDF 203. For example, the first pumping light source 201 may be a semiconductor laser or titanium-sapphire laser capable of emitting the first pumping light 221 in a wavelength band of 980 nm that is a wavelength range of 960 nm to 1020 nm, or a laser module provided with such a laser.

Emitting the first pumping light 221 into the EDF 203 can cause ground state absorption in the EDF 203. Thus, erbium ions in the ground state ($^4I_{15/2}$) can be excited to the upper level ($^4I_{11/2}$), thereby emitting laser light 223 having a wavelength range of 2.8 μm to 2.9 μm.

The second pumping light source 202 may be any one which can emit light (second pumping light 222) in a wavelength band which allows occurrence of excited state absorption from the lower level ($^4I_{13/2}$) in the EDF 203. For example, the second pumping light source 202 may be a semiconductor laser or titanium-sapphire laser capable of emitting the second pumping light 222 in a wavelength band of 790 nm that is a wavelength range of 780 nm to 792 nm, or a laser module provided with such a laser.

Emitting the second pumping light 222 into the EDF 203 can cause excited state absorption from the lower level ($^4I_{13/2}$) in the EDF 203. However, no excited state absorption occurs from the upper level ($^4I_{11/2}$).

The EDF 203 may be any one which is made of a glass material, such as fluoride glass or silica glass, doped with erbium (Er) and can serve as a gain medium. The composition of constituent elements of the EDF 203 is adjusted so that laser light 223 in the wavelength band of 2.8 μm (2.7 μm to 3.0 μm) can be emitted.

For example, the EDF 203 may be a double cladded fiber comprising a core made of a fluoride glass doped with erbium and having a diameter of 10 μm, a first cladding surrounding the core and having a rectangular cross section measuring 100 μm by 200 μm, and a second cladding surrounding the first cladding. The present invention is not limited thereto, and the diameter of the core, and the shape and size of the claddings can be freely determined.

Here, the "double cladded fiber" refers to an optical fiber having two layers of cladding around a core. In such a double cladded fiber, pumping light launched into the fiber propagates in the first cladding around the core, and laser light produced therein propagates in the core.

The collimator lens 204 may be a plano-convex lens made of an optical glass or the like. The collimator lens 204 is disposed to have the planar face opposed to the first pumping light source 201 and the convex face opposed to the multilayer film filter 206. This arrangement allows the pumping light emitted from the first pumping light source 201 to be collimated and the light reflected on the multilayer film filter 206 to be condensed.

The collimator lens 205 may be a plano-convex lens made of an optical glass or the like. The collimator lens 205 is disposed to have the planar face opposed to the second pumping light source 202 and the convex face opposed to the multilayer film filter 206. This arrangement allows the pumping light emitted from the second pumping light source 202 to be collimated and the light reflected on the multilayer film filter 206 to be condensed.

The multilayer film filter 206 may be a dielectric multilayer film filter comprising several to several hundred thin films of materials different in refractive index, such as $SiO_2$ or $Ta_2O_5$, having thicknesses of several tens to several hundred nanometers. The multilayer film filter 206 is disposed in the propagation paths of the first pumping light 221 having passed through the collimator lens 204 and the second pumping light 222 having passed through the collimator lens 205 and, thus, can multiplex the first pumping light 221 and the second pumping light 222.

The condenser lens 207 may be a plano-convex lens made of an optical glass or the like. The condenser lens 207 is disposed in the propagation path of the first pumping light 221 and second pumping light 222 multiplexed by the multilayer film filter 206 in such a manner that the convex face is opposed to the multilayer film filter 206 and the planar face thereof is opposed to an entrance end face 203a of the EDF 203. This arrangement allows the first pumping light 221 and second pumping light 222 multiplexed by the multilayer film filter 206 to be condensed onto the rear mirror 208 provided on the entrance end face 203a of the EDF 203.

The rear mirror 208 may be a dielectric multilayer film filter comprising several to several hundred thin films of materials of different refractive index, such as $SiO_2$ or $Ta_2O_5$, having thicknesses of several tens to several hundred nanometers. The rear mirror 208 is formed on the entrance end face 203a of the EDF 203 by vapor deposition of the dielectric multilayer film or the like. The rear mirror 208 allows the first pumping light 221 and second pumping light 222 to pass therethrough and reflects the laser light produced in the EDF 203. Furthermore, the rear mirror 208 used preferably has a transmittance of 95% or higher for the first pumping light 221 and second pumping light 222 and a reflectance of 99% or higher for the laser light.

The output coupler 209 may be one using Fresnel reflection at the end face as an output coupler or having a dielectric multilayer film, for example. The output coupler 209 is formed on an exit end face 203b of the EDF 203 by vapor deposition of the dielectric multilayer film. The output coupler 209 reflects some of the laser light 223 emitted from the EDF 203 and allows the remainder of the laser light 223 to pass therethrough. The output coupler 209 used preferably has a reflectance of 3% to 90% for the laser light.

The long-wavelength pass filter 210 may be one comprising layers of a plurality of oxides of different refractive index. The long-wavelength pass filter 210 is provided in the propagation path of the laser light 223 emitted from the output coupler 209. The long-wavelength pass filter 210 allows only part of the laser light 223 emitted from the output coupler 209 which has a wavelength of 2.56 μm or longer to pass therethrough.

In the optical fiber laser 200, the rear mirror 208 and the output coupler 209 serve as reflecting mirrors. In addition, since the rear mirror 208 and the output coupler 209 are opposed to each other with the EDF 203 interposed therebetween, the EDF 203, the rear mirror 208 and the output coupler 209 cooperatively function as a resonator 215.

In the optical fiber laser 200, the first pumping light source 201 emits the first pumping light 221 in a wavelength band of 980 nm (960 nm to 1020 nm), and, simultaneously, the second pumping light source 202 emits the second pumping light 222 in a wavelength band of 790 nm (780 nm to 792 nm). The first pumping light 221 and second pumping light 222 are multiplexed by the multilayer film filter 206, and the resulting multiplexed light is condensed by the condenser lens 207 and coupled onto the entrance end face 203a of the EDF 203 with the rear mirror 208.

Then, the EDF 203 is excited by the incident first pumping light 221 and second pumping light 222 and emits the laser light 223 in the wavelength band of 2.8 μm (2.7 μm to 3.0 μm) from the exit end face 203b provided with the output coupler 209.

Now, the first pumping light 221 and second pumping light 222, which are essential in the optical fiber laser according to the latter aspect of the present invention, will be described in detail based on the light emission principles in the optical fiber laser 200.

When the first pumping light 221 in a wavelength band of 980 nm (960 nm to 1020 nm) emitted from the first pumping light source 201 is launched into the EDF 203, ground state absorption (also refereed to as GSA, hereinafter) occurs, and erbium ions in the ground state ($^4I_{15/2}$) are excited to the upper level ($^4I_{11/2}$). Then, when the erbium ions transit from the upper level ($^4I_{11/2}$) to the lower level ($^4I_{13/2}$), the laser light 223 in a wavelength range of 2.8 μm to 2.9 μm is emitted.

The first pumping light 221 in a wavelength band of 980 nm (960 nm to 1020 nm) has a wavelength that allows excitation of the EDF 203 to cause emission of the laser light 223 in a wavelength range of 2.8 μm to 2.9 μm. Among others, the light preferably is in a wavelength range of 960 nm to 1020 nm, which allows emission of the laser light 223 in a wavelength range of 2.8 μm to 2.9 μm of high power with a high efficiency.

Figure 10:
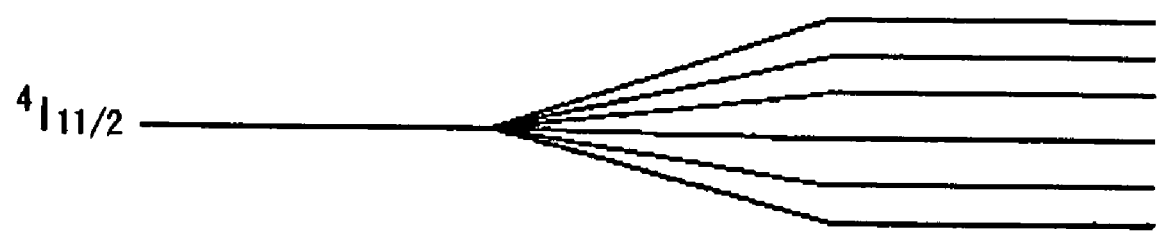
FIG. 10 shows Stark levels of the upper level and the lower level.
Figure 10:
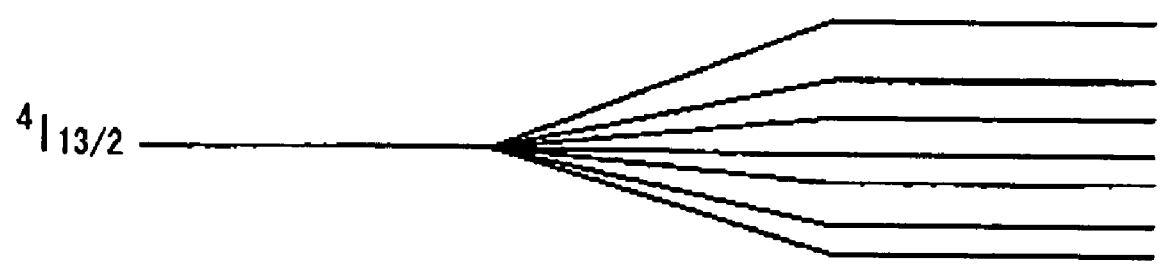

FIG. 10 shows the upper level ($^4I_{11/2}$) and the lower level ($^4I_{13/2}$) of the energy levels of erbium ions in the EDF. As is known, the upper level ($^4I_{11/2}$) and the lower level ($^4I_{13/2}$) are each composed of a plurality of Stark levels shortly spaced from each other.

If, as with the conventional cases, only a pumping light in the wavelength band of 980 nm (960 nm to 1020 nm) is used as pumping light, when the intensity (power) of the pumping light is increased, the number of excited erbium ions increases, and the number of erbium ions occupying the upper level ($^4I_{11/2}$) and the lower level ($^4I_{13/2}$) of the excited levels also increase. Since lower Stark levels are occupied by erbium ions earlier than higher ones in each energy level, the lower Stark levels are occupied by erbium ions.

Thus, when erbium ions transit from the upper level ($^4I_{11/2}$) to the lower level ($^4I_{13/2}$), the erbium ions transit to the higher Stark levels of the lower level ($^4I_{13/2}$), and, accordingly, the higher Stark levels contribute to light emission. Thus, the interval between the upper level ($^4I_{11/2}$) to which the erbium ions transit and the lower level ($^4I_{13/2}$) is reduced, and the wavelength of the emitted light is shifted toward longer wavelengths.

Besides the excitation from the ground state ($^4I_{15/2}$) due to GSA, excitations of erbium ions include excitations from the upper level ($^4I_{11/2}$) or lower level ($^4I_{13/2}$) to still higher levels due to excited state absorption (also referred to as ESA, hereinafter).

The optical fiber laser according to the latter aspect of the present invention uses the second pumping light 222 in a wavelength band of 790 nm (780 nm to 792 nm) in addition to the first pumping light 221 in a wavelength band of 980 nm (960 nm to 1020 nm) and, thus, causes ESA in the erbium ions at the lower level ($^4I_{13/2}$) to excite the erbium ions to another energy level. Thus, the number of erbium ions occupying the lower level ($^4I_{13/2}$) is reduced, enabling the lower Stark levels of the lower level ($^4I_{13/2}$) to contribute to emission of the laser light.

In this way, even if the power of the pumping light is high, the laser light 223 of a constant wavelength can be stably emitted without any shift of the peak wavelength thereof.

Figure 4:
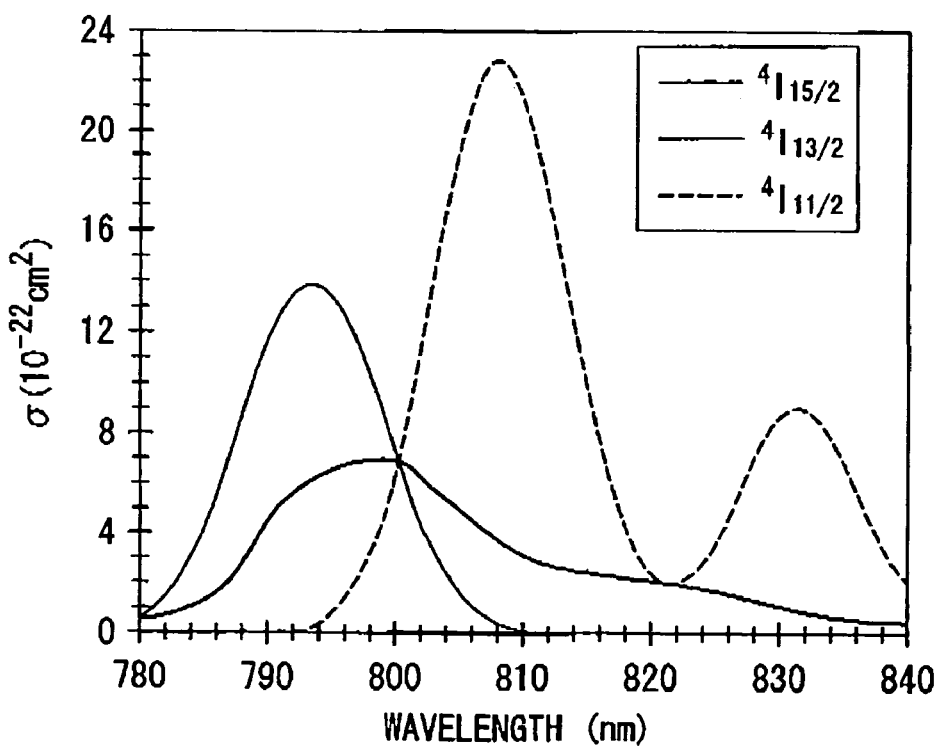
FIG. 4 is a graph showing absorption spectra of the GSA and ESA by erbium ions.

FIG. 4 is a graph showing absorption spectra of the GSA by the erbium ions in the ground state ($^4I_{15/2}$), the ESA by the erbium ions at the upper level ($^4I_{11/2}$) and the ESA by the erbium ions at the lower level ($^4I_{13/2}$). FIG. 4, which shows plots of absorptions with respect to the wavelength of the pumping light, is cited from Applied Physics B, 1998, Vol. 67, pp. 23–28.

As can be seen from FIG. 4, when the wavelength of the pumping light is between 780 nm and 812 nm, ESA occurs in the lower level ($^4I_{13/2}$). In addition, it can be seen that when the wavelength of the pumping light is between 780 nm and 792 nm, ESA occurs in the lower level ($^4I_{13/2}$) but doesn't occur in the upper level ($^4I_{11/2}$).

As the second pumping light 222 in a wavelength band of 790 nm (780 nm to 792 nm), the optical fiber laser according to the latter aspect of the present invention uses light having a wavelength that allows occurrence of ESA by the erbium ions at the lower level ($^4I_{13/2}$) (that is, in a wavelength range of 780 nm to 812 nm in FIG. 4). Among others, preferably used is light in a wavelength range of 780 nm to 792 nm, which can cause ESA by the erbium ions at the lower level ($^4I_{13/2}$) without causing ESA by the erbium ions at the upper level ($^4I_{11/2}$).

Thus, the number of the erbium ions occupying the lower level ($^4I_{13/2}$) can be reduced, so that the lower Stark levels of the lower level ($^4I_{13/2}$) can be made to contribute to light emission. Furthermore, since the second pumping light does not cause ESA to occur in the erbium ions at the upper level ($^4I_{11/2}$) which contribute to emission of the laser light in a wavelength range of 2.8 μm to 2.9 μm, the number of the erbium ions at the upper level ($^4I_{11/2}$) does not decrease.

In this way, by concurrently using the fist pumping light 221 in a wavelength band of 980 nm (960 nm to 1020 nm) and the second pumping light 222 in a wavelength band of 790 nm (780 nm to 792 nm), the laser light 223 of a constant wavelength can be stably emitted from the EDF 203 with high efficiency while preventing the peak wavelength thereof from being shifted toward longer wavelengths, even if the sum of the intensities of the first pumping light 221 and second pumping light 222 is high.

Here, the technical scope of the present invention is not limited to the embodiments described above, and many alterations are possible without departing from the spirit of the present invention.

For example, the first pumping light source 201 and second pumping light source 202 may be provided with a lead fiber at the light emission port thereof so that the first pumping light 221 in a wavelength band of 980 nm (960 nm to 1020 nm) and second pumping light 222 in a wavelength band of 790 nm (780 nm to 792 nm) are emitted via the respective lead fibers. In this case, the lead fibers can be connected to a two-input one-output WDM coupler to multiplex the first pumping light 221 in a wavelength band of 980 nm (960 nm to 1020 nm) and second pumping light 222 in a wavelength band of 790 nm (780 nm to 792 nm) so that they can be emitted through one optical fiber.

Furthermore, one pumping light source that emits two light beams of different wavelengths may be used.

Furthermore, the core radius, refractive index distribution, erbium density distribution and the like of the EDF 203 are not particularly limited. For example, the EDF 203 may be a multimode fiber or one having a first cladding which is a square or circle in cross section.

In the following, the optical fiber laser according to the latter aspect of the present invention will be described in more detail. However, the present invention is not limited to the following example

EXAMPLE

The optical fiber laser 200 shown in FIG. 3 was prepared.

The EDF 203 used was a single mode fiber made of a fluoride glass doped with erbium, having a core of a diameter of 10 μm and having a double cladded structure whose first cladding has a rectangular cross section measuring 100 μm by 200 μm.

The wavelength of the first pumping light 221 launched into the EDF 203 was 980 nm, and the wavelength of the second pumping light 222 was 790 nm.

The relationship between the peak wavelength of the laser light 223 in the wavelength band of 2.8 μm (2.7 μm to 3.0 μm) emitted from the optical fiber laser 200 and the sum of the intensities of the first pumping light 221 and second pumping light 222 was examined. The results are shown in FIG. 5.

Figure 5:
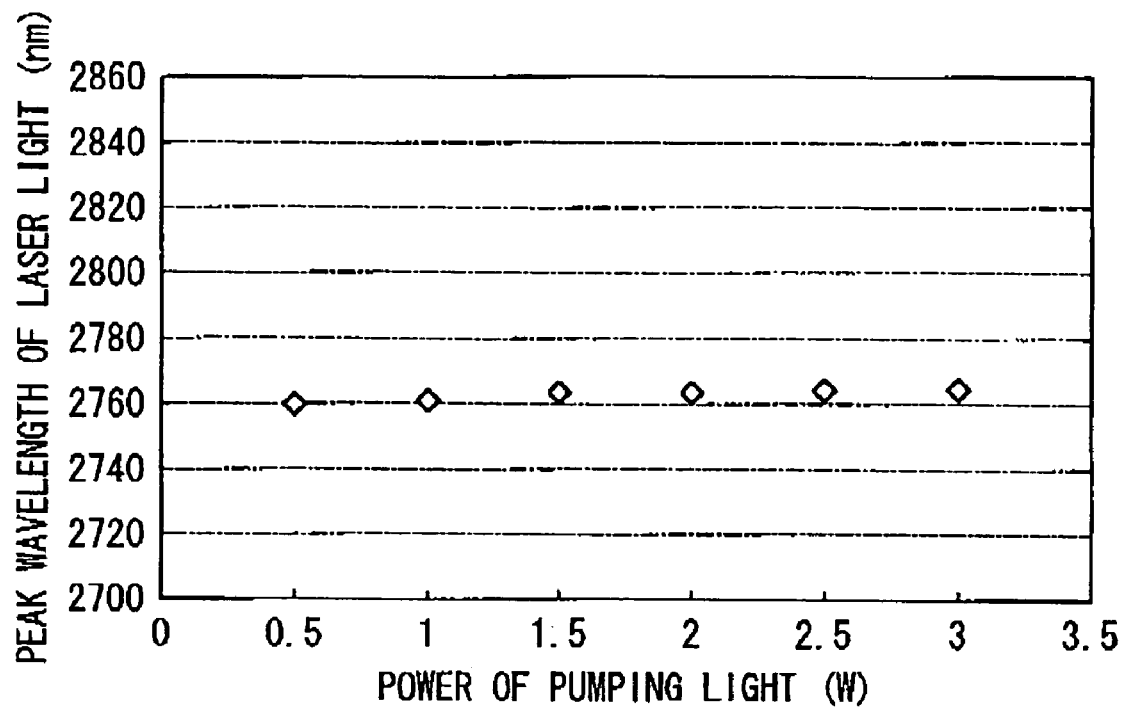
FIG. 5 is a graph showing a relationship between the peak wavelength of laser light in the wavelength band of 2.8 μm (2.7 μm to 3.0 μm) emitted from an exemplary optical fiber laser based on FIG. 3 and the power of the pumping light.

As can be seen from FIG. 5, even if the sum of the intensities of the first pumping light 221 and second pumping light 222 is high, specifically, 1.5 W or higher, the peak wavelength of the emitted laser light 223 is substantially kept constant around 2760 nm. Thus, is was confirmed that, even if the sum of the intensities of the first pumping light 221 and second pumping light 222 varies, the laser light 223 of a constant wavelength can be stably emitted while preventing the peak wavelength thereof from being shifted toward longer wavelengths.

Comparative Example

The optical fiber laser in the Comparative Example differs from the optical fiber laser 200 in the above Example in that the second pumping light source 202 emits the second pumping light 222 of a wavelength of 532 nm.

As in the above Example, the relationship between the peak wavelength of the laser light 223 in the wavelength band of 2.8 μm (2.7 μm to 3.0 μm) emitted from the optical fiber laser and the sum of the intensities of the first pumping light 221 and second pumping light 222 was examined. The results are shown in FIG. 6.

Figure 6:
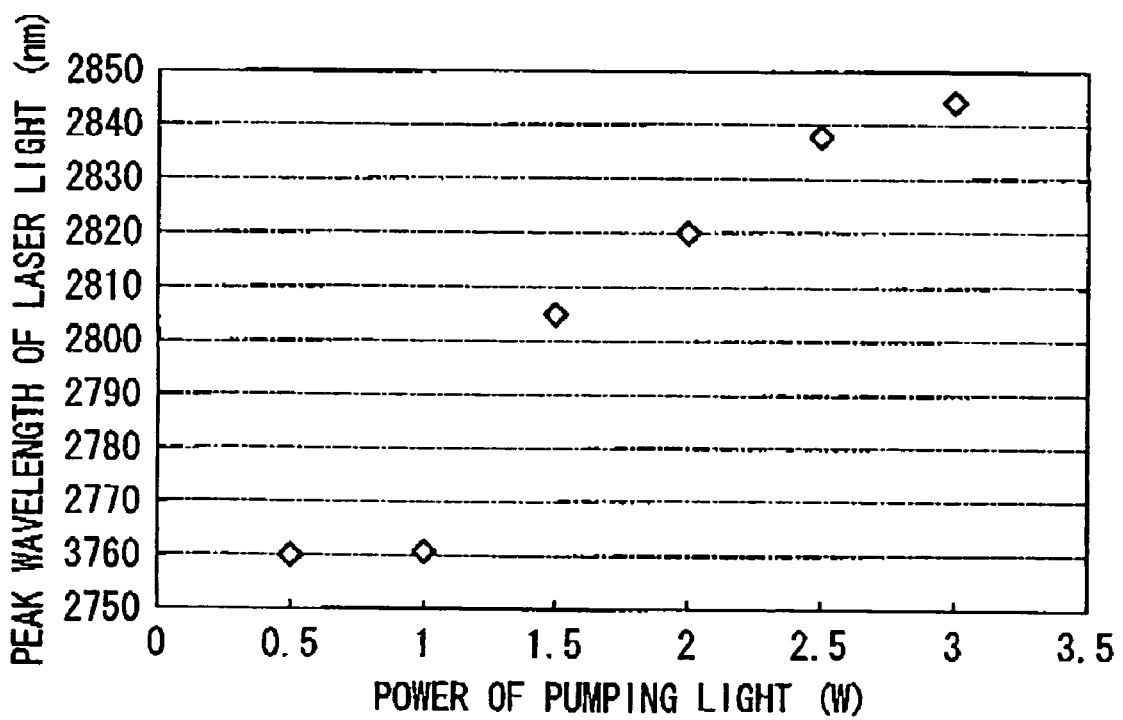
FIG. 6 is a graph showing a relationship between the peak wavelength of laser light in the wavelength band of 2.8 μm (2.7 μm to 3.0 μm) emitted from an optical fiber laser and the power of the pumping light based upon a comparative example.
Figure 7:
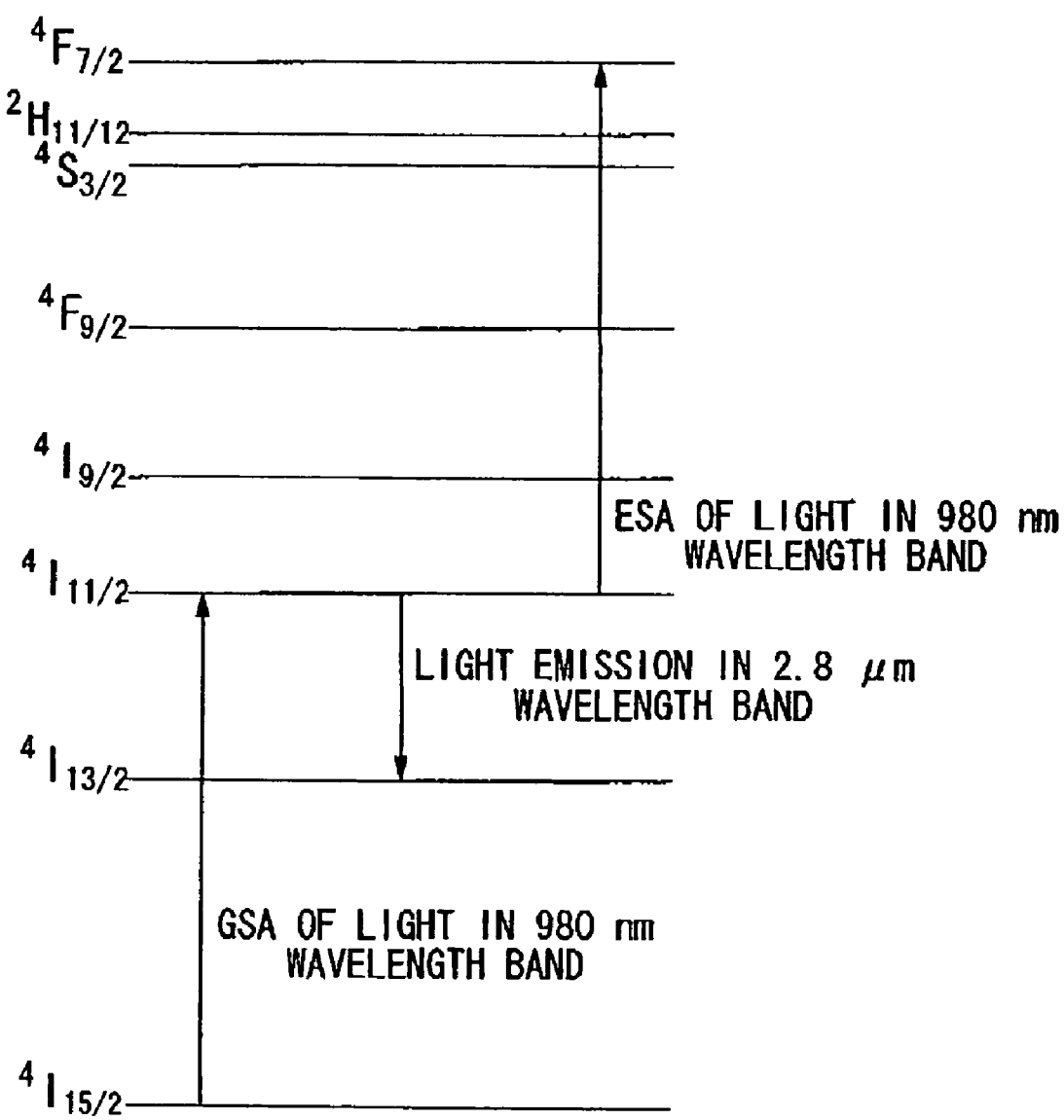
FIG. 7 is a diagram showing energy levels of erbium ions of an erbium-doped fiber.
Figure 8:
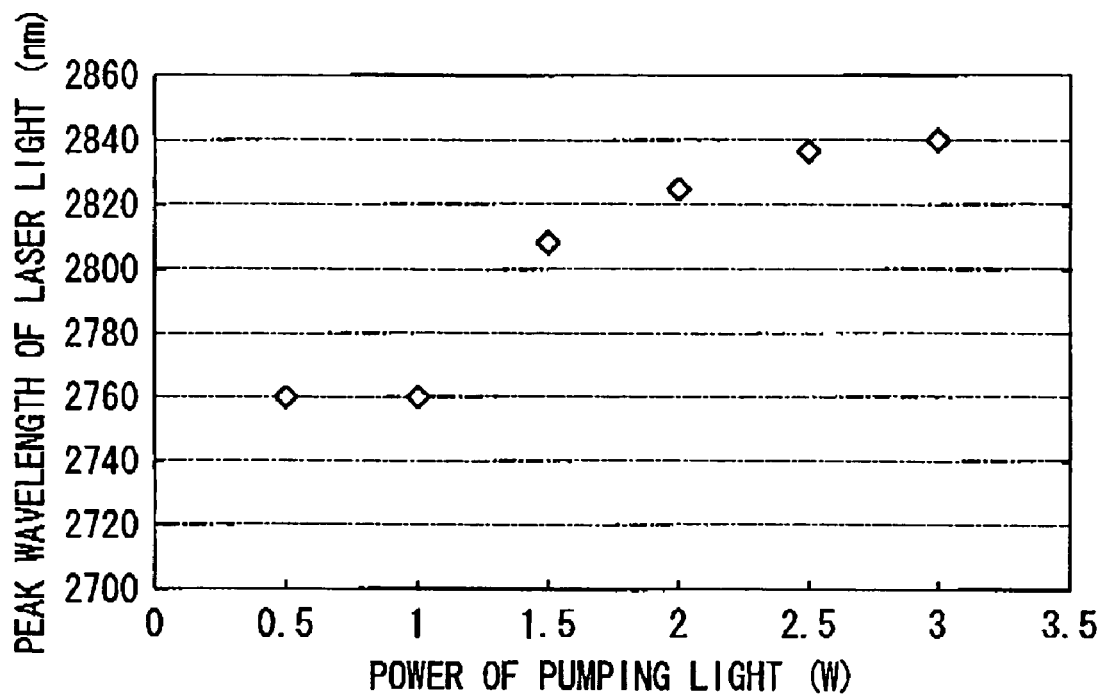
FIG. 8 is a graph showing a relationship between the peak wavelength of laser light emitted from a conventional optical fiber laser and the power of the pumping light.
Figure 9:
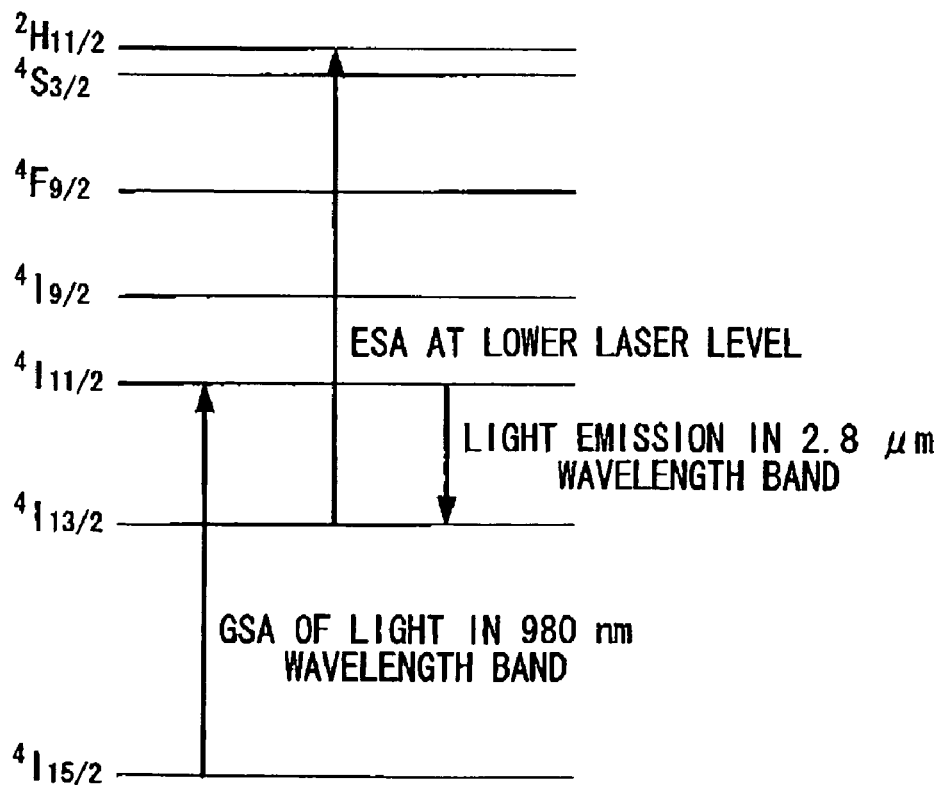
FIG. 9 is a diagram showing energy levels of erbium ions of an erbium-doped fiber.

From the result shown in FIG. 6, it was confirmed that, when the sum of the intensities of the first pumping light 221 and second pumping light 222 is high, specifically, 1.5 W or higher, the peak wavelength of the emitted laser light 223 is shifted toward longer wavelengths.

This is due to the fact that the pumping light of a wavelength of 532 nm causes GSA but does not cause ESA. Thus, in the optical fiber laser of two-wavelength excitation type which uses a pumping light having a wavelength which can cause only GSA, the wavelength of the emitted laser light 223 is shifted toward longer wavelengths. Accordingly, it can be seen that, even if two kinds of pumping light which can cause only GSA are launched into the EDF 203, the wavelength shift of the emitted laser light 223 cannot be suppressed.

It is contemplated that numerous modifications may be made to the embodiments and implementations of the present inventions without departing from the spirit and scope of the invention as defined in the following claims.

What is claimed is:

1. An optical fiber laser comprising:
a resonator comprising an erbium-doped glass fiber serving as a gain medium; and
a plurality of pumping light sources that launch pumping light into said erbium-doped glass fiber,
wherein said plurality of pumping light sources include a first pumping light source that emits first pumping light of between 960 nm and 1020 nm that causes ground state absorption and a second pumping light source that emits second pumping light of between 780 nm and 792 nm that causes excited state absorption from a $^4I_{13/2}$ level.

2. The optical fiber laser according to claim 1,
wherein said optical fiber laser emits laser light in a wavelength band of 2.8 μm due to transition of erbium ions from a $^4I_{11/2}$ level down to the $^4I_{13/2}$ level.

3. The optical fiber laser according to claim 2,
wherein said second pumping light does not cause excited state absorption from the $^4I_{11/2}$ level.

4. A laser light emitting method for emitting laser light by launching a plurality of rays of pumping light into a resonator comprising an erbium-doped glass fiber serving as a gain medium,
wherein, as said plurality of rays of pumping light, first pumping light in a wavelength range of 960 nm to 1020 nm that causes ground state absorption and second pumping light in a wavelength range of 780 nm to 792 nm that causes excited state absorption from a $^4I_{13/2}$ level are concurrently used.

5. The laser light emitting method according to claim 4, wherein laser light in a wavelength band of 2.8 μm is emitted by transition of erbium ions from a $^4I_{11/2}$ level down to the $^4I_{13/2}$ level.

6. A laser light emitting method comprising:

launching a first pumping light having a first wavelength into a resonator having an erbium-doped glass fiber serving as a gain medium, exciting erbium ions of the erbium-doped glass fiber from a ground state to a first energy level;

launching a second pumping light having a second wavelength into the resonator, exciting erbium ions from a second energy level to a third energy level, wherein said second energy level is between the ground state and the first energy level, and said third energy level is higher than said first energy level; and emitting laser light from the resonator resulting from excited erbium ions decaying from the first energy level to the second energy level, wherein said launching of the second pumping light having the second wavelength does not excite erbium ions from the first energy level to a higher energy level.

7. The laser light emitting method according to claim 6, wherein the launching of the first pumping light, the launching of the second pumping light, and the emitting of the laser light are concurrent.

8. The laser light emitting method according to claim 6, wherein the first wavelength and the second wavelength are different.

9. The laser light emitting method according to claim 7, wherein the first wavelength and the second wavelength are different.

10. An optical fiber laser comprising:

a resonator comprising an erbium-doped glass fiber serving as a gain medium;

a first pumping light source means for launching a first pumping light having a first wavelength into said erbium-doped glass fiber and exciting erbium ions of said erbium-doped glass fiber from a ground state to a first energy level; and a second pumping light source means for launching a second pumping light having a second wavelength into said erbium-doped glass fiber and exciting erbium ions from a second energy level to a third energy level, wherein said second energy level is between said ground state and said first energy level, and said third energy level is higher than said first energy level, and said resonator emits laser light resulting from excited erbium ions decaying from said first energy level to said second energy level.

11. The optical fiber laser according to claim 10, wherein said launching of said second pumping light having said second wavelength does not excite erbium ions from said first energy level to a higher energy level.

* * * * *